Figure 1:
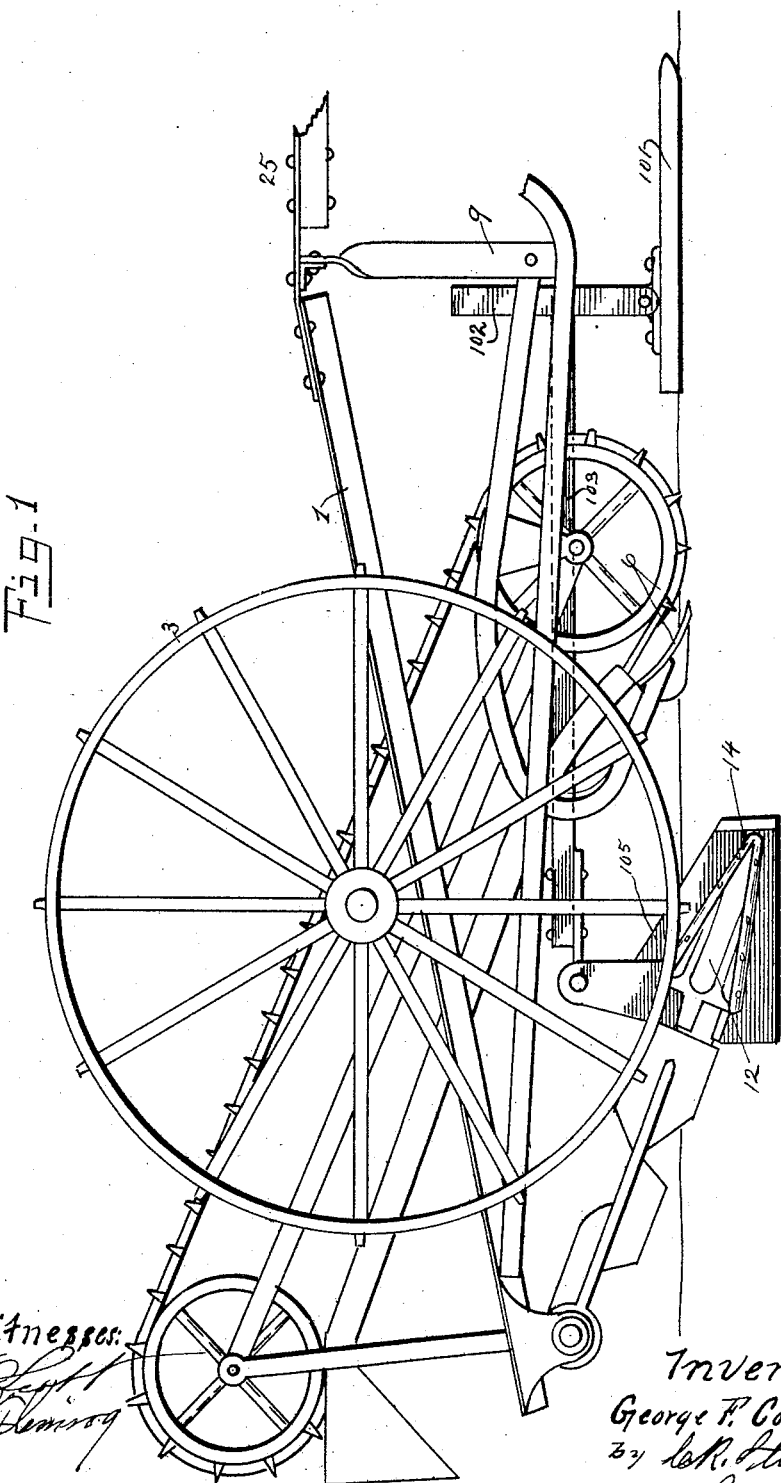

No. 839,918. PATENTED JAN. 1, 1907.
G. F. CONNER.
GUIDE FOR ROOT HARVESTING AND CULTIVATING MACHINES.
APPLICATION FILED MAR. 27, 1906.

3 SHEETS—SHEET 1.

No. 839,918. PATENTED JAN. 1, 1907.
G. F. CONNER.
GUIDE FOR ROOT HARVESTING AND CULTIVATING MACHINES.
APPLICATION FILED MAR. 27, 1906.

3 SHEETS—SHEET 2.

Fig. 2

Witnesses:
E. L. Moak
H. Scott

Inventor:
George F. Conner
By Clement R. Stickney
Attorney.

No. 839,918. PATENTED JAN. 1, 1907.
G. F. CONNER.
GUIDE FOR ROOT HARVESTING AND CULTIVATING MACHINES.
APPLICATION FILED MAR. 27, 1906.
3 SHEETS—SHEET 3.
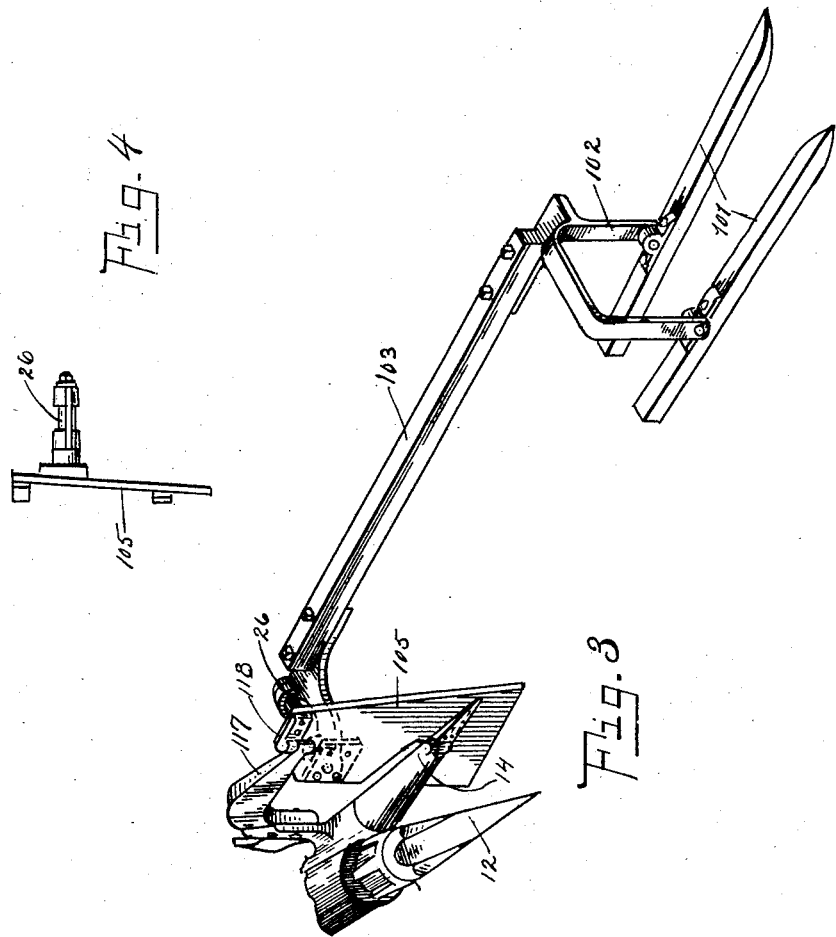
Witnesses:
E. L. Moak
[signature]
Inventor
George F. Conner.
by Clement R. Stickney,
Attorney.

UNITED STATES PATENT OFFICE.

GEORGE F. CONNER, OF PORT HURON, MICHIGAN.

GUIDE FOR ROOT HARVESTING AND CULTIVATING MACHINES.

No. 839,918.  Specification of Letters Patent.  Patented Jan. 1, 1907.

Application filed March 27, 1906. Serial No. 308,274.

*To all whom it may concern:*

Be it known that I, GEORGE F. CONNER, a citizen of the United States, and a resident of the city of Port Huron, county of St. Clair, and State of Michigan, have invented certain new and useful Improvements in Guides for Root Harvesting and Cultivating Machines, of which the following is a full, clear, and exact specification.

In root pulling and topping machines and row-cultivators of the type which comprises a main frame adapted to be drawn along the row or rows to be worked carrying the root-operating or topping members it is necessary in order to avoid skipping or breaking vegetables that the pulling members, topper, or the like be kept in alinement with the row. In machines for these purposes, which may be broadly designated as "root-working" machines, the oscillations of the frame from the swinging of the pole between the team where a two-horse hitch is used, the side slipping and sluing of the wheels or the frame itself if the latter be designed to slide along the ground, from the inequalities of the ground, and the irregularities of the row itself make complete control of the machine by guiding the team an impossibility. This tendency of the machine to run off the row is especially marked in machines of the sulky type, wherein the frame is hung on a pair of bearing-wheels, as it is subject to both lateral and vertical oscillations.

This invention relates to means for holding the root working or operating members in correct relation to the row over which the machine is drawn independent of the swaying and swinging or a tendency to lead to one side under uneven draft or on a side-hill and for automatically following the irregularities of the row and leading the operating parts along it without attention on the part of the operator.

The invention consists in the matters hereinafter set forth, and more particularly pointed out in the appended claims.

For purposes of illustration the guide is herein shown as adapted for use with a beet pulling and topping machine, although it is not limited to the specific design and arrangement of parts herein described.

In the drawings, Figure 1 is a view in side elevation of a beet-harvester fitted with a guide embodying the principal features of the invention. Fig. 2 is a view in isometric projection of the machine with parts broken away and the guide in full. Fig. 3 is a view in isometric projection of the guide, showing one form of attachment to the machine. Fig. 4 is a front view of a fin for the guide.

Referring to the drawings, 1 represents the main frame of a beet-harvester, mounted on a pair of traction-wheels 3 and carrying pulling members 12 and 14, which in this type of machine are adapted to straddle a beet row and enter the ground one on each side of it. Forward of the pulling members is a gage-topper 6, both topper and pulling members being operated by the traction-wheels 3 through intermediate mechanism of approved type. A pole 25 for the attachment of the draft-rigging and the team, rigidly secured to the main frame, extends from the forward end.

The guide proper is secured to the machine near the center of oscillation of the frame—that is, below and in line with the traction-wheels, where in machines of this type the pulling members are preferably located—so as not to be materially disturbed or lifted from the ground by the uptilting of the frame. A thin upright plate or fin 105, of sheet metal or suitable material, is vertically pivoted to the main frame or to the pulling members or their frame, as the case may be, so that its lower portion penetrates the earth alongside of and below the path of action of the pulling-cones 12 and 14.

Where the pulling members are both rotary, it is necessary, of course, to hinge the fin to the cone-frame itself. As herein shown, however, where one of the pulling-cones is stationary the fin is hinged either to the outer end of the stationary cone, as in Fig. 3, in which case an upper arm or brace 117, with a hinge 118, affords support for the upper part of the plate, or else the fin is permanently secured to the stationary or non-rotatable member 14, which itself is pivoted or hinged in an appropriate manner to the cone frame or support, so that the fin may swing in a vertical plane.

The fin 105 is provided with a horizontal arm or pivot-stud 26, to which the rear end of an arm 103 is journaled. The forward end of the arm 103, which extends beyond the gage-topper 6, is rigidly secured by appropriate means to an arched frame or downturned yoke 102, lying normally in front of and in line with the topping and pulling means.

A pair of parallel or slightly-divergent shoes or runners 101 of suitable material and of sufficient length to span two or more hills are each pivotally secured between their ends or to rear of their centers to an arm of the yoke 102, so that they are free to rock up and down independently and follow the inequalities of the ground. They are spaced at an interval which allows them to bear against opposite sides of the ridge of earth or successive hills, beet-tops, crowns, stalks, &c., which form a beet row and will be hereinafter designated as such. The runners are outwardly curved at their outer ends, or their proximate faces are convex, so that they readily follow the row, and are further designed so as to underrun the stalks of the lower widespread matted leaves and lift them up, so that they are forced to pass between the arms of the yoke, which is preferably proportioned to compress the tops within the lateral range of the following gage-topper 6.

The lateral swinging of the yoke is limited by suitable means—as, for instance, stops, between which it is free to play—and in the form of machine-frame herein illustrated may conveniently consist of depending braces 9. It is further to be understood that lifting-levers or other suitable means of preferred construction are provided for swinging the guide clear of the ground for transporting the machine.

In operation the pilot of the guide slides along the row over which the machine is drawn in advance of the topper and pulling members, with the fin cleaving the earth, where it is undisturbed by the cones. Inasmuch as the pilot is movable vertically and laterally independently of the main frame, the swinging of the frame up and down as the team or wheels encounter inequalities of the ground does not disturb it, so that the runners bear against the row and readily follow it. The lateral oscillations of the pole between the horses and consequent side swaying of the frame do not disturb the position of the pilot in relation to the row, and the latter, with its divergently-curved runners, readily follows the row and holds the fin in lateral alinement with the row, thus keeping the pulling members and the intermediate topper in operative relation to the row regardless of the angular deflections of the main frame in relation thereto.

A directing member, comprising one feature of the invention, is the free angular movement of the pilot and guide in relation to the frame. The connection of the pilot and fin and the fin and frame is, in effect, a universal joint, and this may, as herein shown, be situated at practically the center of oscillation of the machine, so that the fin is not raised out of the earth, and thus holds the pullers or topper at all times against lateral movement. Furthermore, the minor oscillations of the machine, both lateral and vertical, do not affect the pilot, so that the latter freely follows the row and is not forced therefrom, the side movements of the frame, either angular or otherwise, bringing no pressure whatever against the runners. The fin prevents the machine from leading off to one side, as when on a side-hill or under unequal draft. Obviously the fin may be of any design adapted to cut through the earth, the construction herein shown being preferred, as the fin does not tend to lift itself out or ride up onto the surface. Another feature of the invention is the position and arrangement of the pilot, whose runners present a broad surface laterally, and thus are not readily moved sidewise over the row, as a wheel might be. Again, the runners are not lifted or deflected by a loose clod or lump, as they either force the latter aside or underrun it. The runners and yoke may also conveniently form a compressor, which brings the tops within the range of the following topper. Another feature of the invention is the adaptability of the guide for use with various types of machines, as the fin may be jointed to the frame in the proper relation to a topper, lifter, puller, or cultivating blade or hoe, so as to run in soil undisturbed thereby, while the pilot is pushed along the row in advance of the member to be alined with the row, the parallel relation of the fin and runners holding the parts in place. The machine-frame may be of any design, supported by two, three, or more wheels, or the frame may slide along the ground. In any case the relative freedom of movement of the guide therein automatically determines the position of the machine in relation to the row.

I claim as my invention—

1. A guide for a root-working machine, comprising a directing member and a controlling member determining the angular position of the directing member in the machine.

2. A guide for a root-working machine comprising an earth-penetrating member whose angular position in the machine is determined by a row-following pilot.

3. A guide for a root-working machine having a universal-joint connection with the machine-frame, comprising a directing member and a row-following controlling member.

4. A guide for a root-working machine comprising a directing member and a leaf gathering and compressing member determining the angular position of the directing member in the machine.

5. A guide for a root-working machine, comprising an upright fin and a row-following member determining the angular position of the fin in the machine.

6. A guide for a root-working machine comprising an upright fin vertically pivoted in the machine, and a row-following member determining the angular position of the fin in the machine.

7. A guide for a root-working machine comprising an earth-cleaving, upright fin pivoted in the machine, and a row-following, controlling member determining the angular position of the fin in the machine.

8. A guide for a root-working machine, comprising a directing member and a pivot whose lateral position is controlled by the row along which it advances, determining the angular relation of the directing member in the machine.

9. A guide for a root-working machine comprising a directing member vertically pivoted in the machine-frame, and a row-following pilot, rigidly connected to the directing member.

10. A guide for a root-working machine comprising an earth-penetrating directing member vertically pivoted in the machine-frame, a row-following pilot, and a pilot-arm rigidly secured to the pilot and horizontally pivoted to the earth-penetrating directing member.

11. A guide for a root-working machine comprising a directing member and a row-following pilot determining the angular relation of the directing member to the machine, consisting of a pair of spaced runners adapted to bear against opposite sides of a beet row.

12. A guide for a root-working machine comprising a directing member and a row-following pilot consisting of a pair of runners spaced at an interval, bearing on the row in advance of the directing member, and secured to the forward end of an arm which is horizontally pivoted to the directing member.

13. A guide for a root-working machine comprising a directing member vertically pivoted in the machine, and a row-following pilot comprising a pair of runners yoked together and secured to the forward end of an arm horizontally pivoted to the directing member.

14. A guide for a root-working machine comprising an earth-penetrating member vertically pivoted in the machine, a pilot consisting of a downturned yoke and runners secured to the yoke ends, and a pilot-arm whose forward end is rigidly secured to the yoke and whose rear end is horizontally pivoted to the earth-penetrating member.

15. A guide for a root-working machine comprising an upright fin vertically pivoted in the machine, a pilot consisting of a downturned yoke and runners secured to the ends of the yoke, and a pilot-arm whose forward end is rigidly secured to the yoke and whose rear end is horizontally pivoted to the fin.

16. The combination with a beet-harvester of a guide comprising an earth-penetrating, directing member, and a row-following pilot determining the angular relation of the directing member to the harvester-frame.

17. The combination with a beet-harvester having a main frame and pulling members secured thereto, of a guide comprising an earth-penetrating, directing member pivotally secured near the pulling members, and a row-following pilot in advance of the pulling members, determining the angular relation of the directing member and the main frame.

18. The combination with a beet-harvester having a main frame and pulling members secured thereto, of a guide comprising an earth-penetrating, directing member pivotally secured near the pulling members, and a row-following pilot determining the angular relation of the directing member to the main frame, secured to the directing member independently of the main frame.

19. The combination with the main frame of a beet-harvester, of a guide secured thereto by a universal-joint connection, said guide comprising an earth-penetrating, directing member and a row-following pilot determining the angular relation of the main frame and directing member.

20. The combination with the main frame of a beet-harvester of a guide secured thereto by a universal-joint connection only, said guide comprising an earth-penetrating, directing member and a row-following pilot, determining the angular relation of the frame and directing member.

21. The combination with the main frame of a bearing-wheel-supported beet-harvester, of a guide penetrating the earth and secured to the frame by a universal-joint connection only, whose angular relation to the main frame is determined by a row-following pilot.

22. The combination with a beet-harvester having a main frame and beet-pulling members secured thereon, of a guide comprising an upright fin vertically pivoted near the pulling members and a row-following pilot in advance of and in alinement with the pulling members, secured to the forward end of a pilot-arm whose rear end is horizontally pivoted to the fin.

23. The combination with the main frame, pulling members and topper of a beet-harvester, of a guide comprising an earth-penetrating, directing member pivotally secured near the pulling members, and a row-following pilot in advance of and in alinement with the pulling members and topper, determining the angular relation of the directing member and the main frame.

24. The combination with the main frame of a beet-harvester of an upright fin penetrating the earth, angularly movable in relation to the main frame, and a pilot secured to the fin in advance thereof, by an arm horizontally pivoted to the fin at its rear end and rigidly secured to the pilot at its forward end.

25. In a beet-harvester having pulling members, and a topper in advance thereof, a guide comprising an earth-penetrating, directing member secured near the pulling members, and a leaf-gathering and top-compressing pilot following the row in advance of the topper, and determining the relative angular position of the directing member and the harvester-frame.

26. In a beet-harvester having pulling members and a topper in advance thereof, a guide comprising an earth-penetrating directing member and a row-following pilot in advance of and in alinement with the topper and pulling members, determining the angular relation of the directing member to the machine-frame, adapted to raise and compress beet-tops within the range of action of the topper.

27. In a beet-harvester having pulling members and a topper, a guide comprising an earth-penetrating directing member secured near the pulling members, and a leaf-lifting and top-compressing pilot, having the range of action of the topper and in advance thereof, secured to the directing member by an arm whose rear end is horizontally pivoted to the directing member.

28. The combination with the main frame of a beet-harvester supported by a pair of bearing-wheels, of a guide secured to the frame by a universal joint near the center of oscillation of the frame, comprising an earth-penetrating, directing member and a row-following pilot determining the lateral, angular relation of the directing member and the frame.

29. The combination with the main frame of a beet-harvester supported by a pair of bearing-wheels, of a guide comprising an earth-penetrating, directing member vertically pivoted to the main frame near the center of oscillation of the frame, and a row-following pilot independent of the frame, having laterally-rigid and vertically-movable connection with the directing member.

30. The combination with the main frame of a beet-harvester supported by a pair of bearing-wheels, of an earth-penetrating, upright fin vertically hinged to the main frame near its center of oscillation, a pilot-arm whose rear end is horizontally pivoted to the fin, and a row-following pilot, rigidly secured to the forward end of the pilot-arm.

31. The combination with the pulling members of a beet-harvester, of an upright fin penetrating the earth, articulated to one of the pulling members, and a row-following pilot in advance of the pulling members, rigidly secured to the forward end of an arm whose rear end is horizontally pivoted to the fin.

32. The combination with the pulling members of a beet-harvester, of a directing member articulated thereto, cleaving the earth beyond the range of action of the pulling members, and a row-following pilot in advance of the pulling members, maintaining the directing member in parallel relation to the row of beets over which the machine advances.

33. The combination with the pulling members of a beet-harvester of an upright fin articulated thereto, cleaving the earth beyond the range of action of the beet-pullers, and a row-following pilot in advance of the pulling members, having vertically-movable and laterally-rigid parallel connections with the fin.

34. The combination with the pulling members of a beet-harvester of an upright fin articulated thereto, cleaving the earth beyond the range of action of the pulling members, and a pilot consisting of a pair of spaced runners bearing on opposite sides of a beet row, and a connecting member maintaining pilot and fin in laterally-parallel relation.

35. In a beet-harvester, a guide comprising an earth-penetrating directing member and an automatic, row-following pilot secured to the said member in advance thereof.

36. In a beet-harvester, a guide comprising an earth-penetrating member, and an automatic, row-following pilot secured thereto.

In witness whereof I have hereunto set my name, in the presence of the subscribing witnesses, this 24th day of March, A. D. 1906.

GEORGE F. CONNER.

Witnesses:
C. R. STICKNEY,
H. SCOTT.

It is hereby certified that in Letters Patent No. 839,918, issued January 1, 1907, upon the application of George F. Conner, of Port Huron, Michigan, for an improvement in "Guides for Root Harvesting and Cultivating Machines," errors appear in the printed specification requiring correction, as follows: On page 1, lines 18, 19, and 20, the words "In machines for these purposes, which may be broadly designated as 'root-working' machines," should be stricken out, and the following word "the" should commence with a capital $T$; on page 2, line 59, the words "A directing member, comprising" should be stricken out, and the following word "one" should commence with a capital $O$. and on page 3, line 12, the word "pivot" should read *pilot;* and that the said Letters Patent should be read with these corrections therein that the same may conform to the record of the case in the Patent Office.

Signed and sealed this 12th day of February, A. D., 1907.

[SEAL.]

F. I. ALLEN,
*Commissioner of Patents.*